(12) United States Patent
Tyson et al.

(10) Patent No.: US 12,513,391 B2
(45) Date of Patent: Dec. 30, 2025

(54) REMOTE SELFIE PHOTOGRAPHY SYSTEM AND ASSOCIATED METHODS

(71) Applicant: Colorvision International, Inc., Orlando, FL (US)

(72) Inventors: Henry Tyson, Orlando, FL (US); Bryan Wilkins, Sanford, FL (US); Jeffrey Jonathan Douglas, St. Cloud, FL (US); Jason Stanford Pinder, Winter Garden, FL (US); Sean Thomas Karp, Homosassa, FL (US)

(73) Assignee: COLORVISION INTERNATIONAL, INC., Orlando, FL (US)

( * ) Notice: Subject to any disclaimer, the term of this patent is extended or adjusted under 35 U.S.C. 154(b) by 268 days.

(21) Appl. No.: 18/361,019

(22) Filed: Jul. 28, 2023

(65) Prior Publication Data
US 2024/0040243 A1 Feb. 1, 2024

Related U.S. Application Data

(60) Provisional application No. 63/369,677, filed on Jul. 28, 2022.

(51) Int. Cl.
*H04N 23/661* (2023.01)
*G06K 7/14* (2006.01)
*H04N 5/272* (2006.01)
*H04W 4/021* (2018.01)

(52) U.S. Cl.
CPC .......... *H04N 23/661* (2023.01); *H04W 4/021* (2013.01); *G06K 7/1417* (2013.01); *H04N 5/272* (2013.01)

(58) Field of Classification Search
CPC ...... H04N 23/661; H04N 5/272; H04N 23/60; H04W 4/021; G06K 7/1417
See application file for complete search history.

(56) References Cited

U.S. PATENT DOCUMENTS

| | | | |
|---|---|---|---|
| 6,396,537 B1* | 5/2002 | Squilla | H04N 1/2112 396/311 |
| 7,236,185 B2* | 6/2007 | Terada | H04N 23/62 348/E5.043 |
| 10,943,188 B2* | 3/2021 | Polk | G06Q 10/06311 |
| 11,962,890 B1* | 4/2024 | Luo | H04N 23/62 |
| 2007/0295807 A1* | 12/2007 | Antos | G06Q 30/06 235/382 |
| 2008/0132214 A1* | 6/2008 | Dupray | H04M 3/4878 455/456.3 |
| 2013/0293720 A1* | 11/2013 | Tyson | H04N 1/00196 348/159 |

(Continued)

*Primary Examiner* — Timothy J Henn
(74) *Attorney, Agent, or Firm* — ALLEN, DYER, DOPPELT, + GILCHRIST, P.A. Attorneys at Law

(57) ABSTRACT

A photography system includes a camera having a geofenced region associated therewith, and a web server to provide a website to communicate with the camera and to access coordinates defining the geofenced region. A mobile device includes a processor to access the website via the web server, allow the website to access location of the mobile device, and receive video from the camera via the website in response to the location of the mobile device being within the geofenced region. A display is coupled to the processor to display the received video along with a user-selected input for a user to operate the camera to take a photo.

20 Claims, 10 Drawing Sheets

(56) References Cited

U.S. PATENT DOCUMENTS

| | | | | |
|---|---|---|---|---|
| 2014/0168477 A1* | 6/2014 | David | ................ | G06Q 30/0621 |
| | | | | 348/441 |
| 2015/0207976 A1* | 7/2015 | Sako | ................ | H04N 21/42202 |
| | | | | 348/211.2 |
| 2015/0350520 A1* | 12/2015 | Yamashita | ......... | H04N 1/00209 |
| | | | | 348/207.1 |
| 2017/0295384 A1* | 10/2017 | Mottur | ................ | H04N 21/2187 |
| 2017/0332050 A1* | 11/2017 | Yamashita | ............ | G06V 40/172 |
| 2017/0366591 A1* | 12/2017 | Thomas | ................... | H04L 69/04 |
| 2018/0027102 A1* | 1/2018 | Siminoff | ................. | H04L 67/10 |
| | | | | 709/203 |
| 2021/0058383 A1* | 2/2021 | Colon | ................... | H04W 12/61 |

\* cited by examiner

REMOTE SELFIE PHOTOGRAPHY SYSTEM AND ASSOCIATED METHODS

RELATED APPLICATION

This application claims the benefit of U.S. provisional application Ser. No. 63/369,677 filed Jul. 28, 2022, which is hereby incorporated herein in its entirety by reference.

TECHNICAL FIELD

The present disclosure relates to photography systems, and more particularly, to a user-controlled photography system.

BACKGROUND

When visiting theme parks, such as Disney and Universal, for example, it is common for guests to be approached by a theme park photographer to have their photo taken as a souvenir that can later be retrieved at a designated area for purchase. For each park guest and their group having their photos taken, a printed ticket with a number corresponding to their particular photos is given to them by the theme park photographer.

Prior to leaving the theme park, the park guest can present their printed ticket at a photography gift shop. A photography database is searched using the number on the printed ticket which corresponds to the bar code used to identify their photos.

A drawback of using theme park photographers to capture the experiences of theme park guests is cost. The use of theme park photographers is labor intensive. In addition, theme park photographers typically roam around the theme park, which means that park guests may miss out on the opportunity to have their photo taken at certain spots that are very scenic and reflective of their experiences at the theme park.

Another drawback corresponds to use of the printed tickets given to the park guests by the theme park photographers. If a printed ticket is lost or misplaced, the photos associated with that ticket cannot be easily retrieved.

SUMMARY

A photography system may include a camera having a geofenced region associated therewith, and a web server to provide a website to communicate with the camera and to access coordinates defining the geofenced region. A mobile device includes a processor to access the website via the web server, allow the website to access location of the mobile device, and receive video from the camera via the website in response to the location of the mobile device being within the geofenced region. A display coupled to the processor displays the received video along with a user-selected input for the user to operate the camera to take a photo.

The website may be configured to place the user of the mobile device in a virtual queue until their turn is next in line.

The display may be configured to display how many people are in line ahead of the user when in the virtual queue. The display may also be configured to display an approximate wait time when in the virtual.

A code may be displayed within the geofenced region, with the code having an embedded web address for the website. The mobile device may include a camera and a browser coupled to the processor, with the camera being configured to scan the code for the processor to access the website via the browser.

The website may be configured to access a location of the mobile device in response to the mobile device accessing the website, with the accessed location to be used to determine that the mobile device is within the geofenced region.

In response to the user operating the camera to take the photo via the user-selected input, the photo is displayed on the display. The website may place a themed overlay on the displayed photo.

The display may display with the photo a save user input and a retake user input. In response to the user selecting the save user input, the photo is saved by the website. The mobile device having generated a device ID to be used by the website to link the user of the mobile device to the saved photo.

Another aspect is directed to a method for operating the photography system as described above. The method may include providing a camera having a geofenced region associated therewith, and providing a website to communicate with the camera and to access coordinates defining the geofenced region. The mobile device may be operated to access the website via the web server, allow the website to access location of the mobile device, and receive video from the camera via the website in response to the location of the mobile device being within the geofenced region. The received video may be displayed along with a user-selected input for a user to operate the camera to take a photo.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
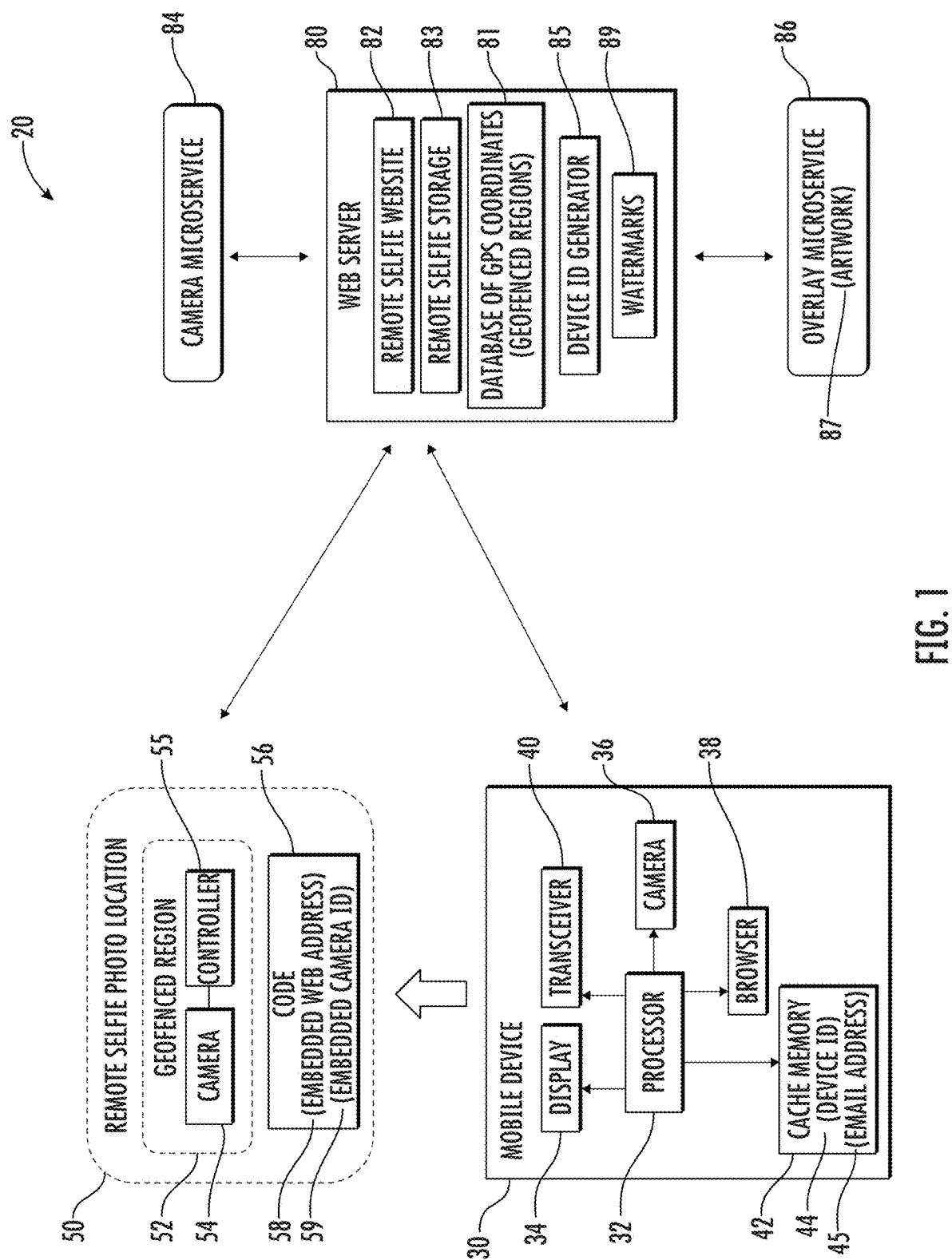
FIG. 1 is a block diagram of a remote selfie photography system in which various aspects of the disclosure may be implemented.

Referring initially to FIG. 1, a remote selfie photography system 20 for one or more remote selfie photo locations 50 will be discussed. The remote selfie photo locations 50 may be any location where a user would like to have their photo taken.

The remote selfie photo locations 50 may be at theme parks, zoos, aquariums, museums, national and state parks, concerts and events, and golf courses, for example. In some cases, the user may be referred to as a guest if a ticket was purchased to enter any of the locations.

Each remote selfie photo location 50 has at least one control mounted camera 54 with a geofenced region 52 associated therewith. The control mounted camera 54 may also be referred to as a camera. The geofenced region 52 is a virtual geographic boundary defined by GPS coordinates within the remote selfie photo location 50.

In order for the user to operate the control mounted camera 54, the mobile device 30 scans a code 56 that is displayed in close proximity to the camera 54. The code 56 may be a QR code, for example. The code 56 includes an embedded web address 58 to a web server 80 that provides a remote selfie website 82, and an embedded camera ID 59.

The mobile device 30 includes a camera 36, a browser 38 and a transceiver 40 coupled to the processor 32. The camera 36 is used to scan the code 56 in order for the processor 32 to use the embedded web address 58 to access the remote selfie website 82 via the browser 38 and the transceiver 40.

The processor 32 also provides the camera ID 59 to the remote selfie website 82. The remote selfie website 82 uses the camera ID 59 to determine the GPS coordinates defining the geofenced region 52 for the camera 54. This is performed by comparing the camera ID 59 to a database of GPS coordinates 81. The database of GPS coordinates 81 define geofenced regions 52 for different camera IDs 59.

The remote selfie website 82 is configured to communicate between a user's mobile device 30 and the control mounted camera 54 within the geofenced region 52. The remote selfie website 82 may also be referred to as a remote selfie web app.

The control mounted camera 54 may be coupled to a controller 55 that is configured to interface with the web server 80. The mobile device 30 receives video from the control mounted camera 54 via the remote selfie website 82 in response to the location of the mobile device 30 being within the geofenced region 52.

A display 34 is coupled to the processor 32 and is configured to display the video received from the control mounted camera 54. Displayed along with the received video is a user-selected input for the user to operate the control mounted camera 54 to take a selfie photo.

Microservices may be used by the remote selfie website 82 to provide specific functions supporting the remote selfie website 82. Each microservice is independently deployable and communicates over well-defined APIs.

A camera microservice 84 interfaces with the remote selfie website 82 and the control mounted camera 54 to allow the user to view a live feed from the camera 54. The remote selfie website 82 provides instructions to the user on how to trigger the control mounted camera 54 to take a selfie photo.

Once the selfie photo has been taken, the remote selfie website 82 interfaces with an overlay microservice 86 that provides specialized artwork 87 to be overlaid on the selfie photo. The type of artwork 87 may be based on a theme of the remote selfie photo location 50.

In response to the user deciding to save the selfie photo, an association is made by the remote selfie website 82 to link identification of the user to the saved selfie photo. After the association, the user is able to later retrieve the selfie photo with the overlaid artwork 87 for purchase.

As will be discussed in greater detail below, identification of the user is based on a device ID 44 assigned to the mobile device 30 by the remote selfie website 82. The device ID 44 may also be referred to as a phone code or an identification code and is saved in cache memory 42 in the mobile device 30.

When the mobile device 30 initially accesses the remote selfie website 82 for a first time, the remote selfie website 82 checks the cache memory 42 in the mobile device 30 for a device ID 44. If a device ID 44 is not in the cache memory 42, then the remote selfie website 82 generates the device ID 44 using a device ID generator 85 at the web server 80.

The remote selfie website 82 then provides the device ID 44 to the mobile device 30 for storage in the cache memory 42. The next time the mobile device 30 accesses the remote selfie website 82, the remote selfie website 82 determines that the cache memory 42 includes the device ID 44. The device ID 44 is later used by the remote selfie website 82 to link the saved photo to the user of the mobile device 30.

The device ID 44 is advantageously used by the hardware in the user's mobile device 30 without violating privacy laws. Privacy laws generally prohibit use of the IMEI (International Mobile Equipment Identity) number that is assigned to the mobile device 30.

The IMEI number is a unique 15-digit number that serves as a fingerprint of the mobile device 30. The IMEI number is sensitive information that should only be shared with the phone carrier for trouble-shooting or for disabling a stolen mobile device 30. Consequently, the operating system of the mobile device 30 does not permit the IMEI number to be retrieved to be used as an identifier of the user.

Figure 2:
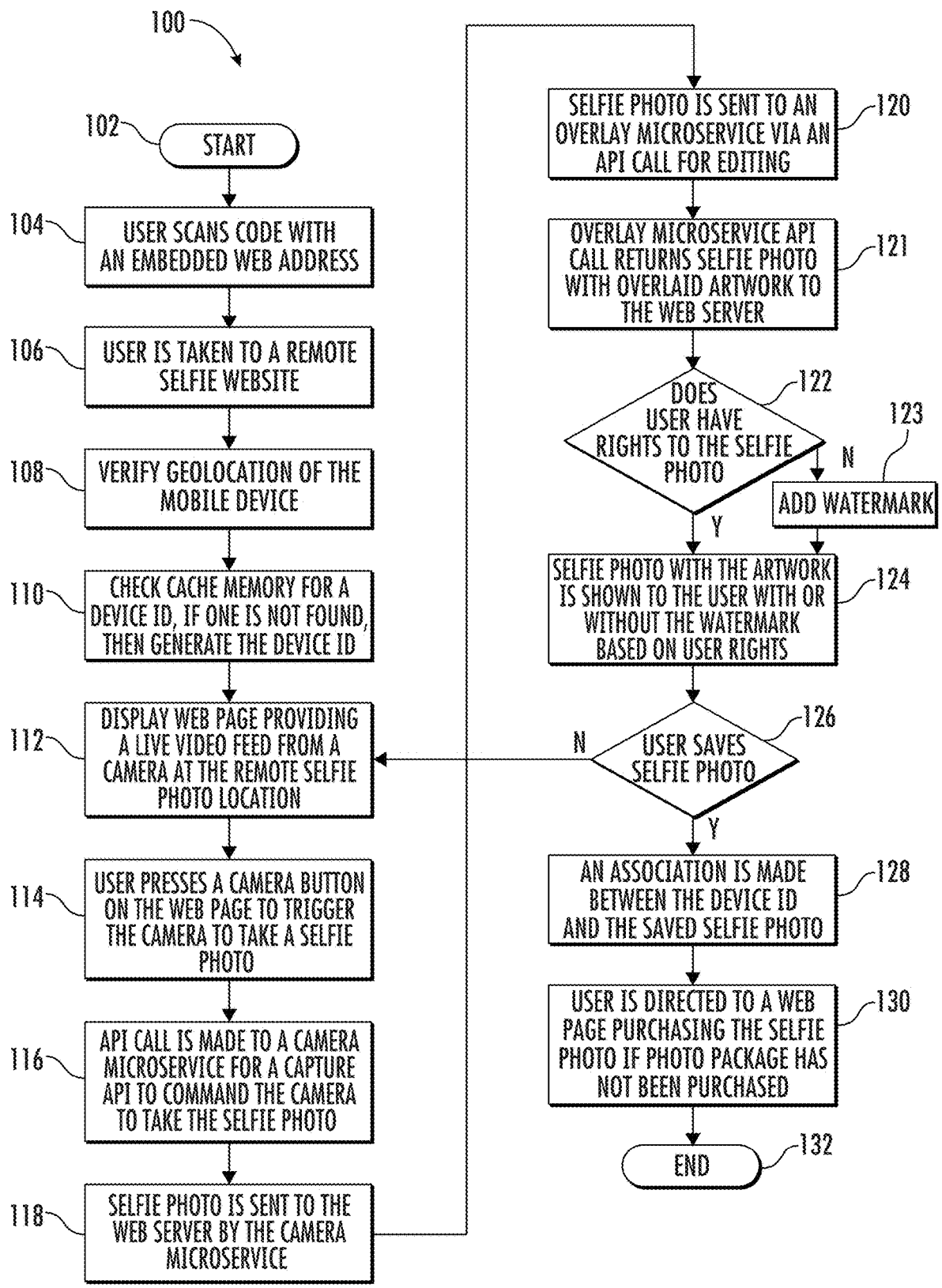
FIG. 2 is a flow diagram for operating the remote selfie photography system illustrated in FIG. 1.

A flow diagram 100 for operating the remote selfie photography system 20 will be discussed in reference to FIG. 2. From the start (Block 102), a user of the mobile device 30 scans the code 56 displayed at the remote selfie photo location 50 at Block 104. Scanning the code 56 is initiated using the camera 36 within the mobile device 30. The camera 36 may then operate as a scanner using either a code scanning app on the mobile device 30 or a scanning app built into the camera 36.

The code 56 may be a QR code, for example. The code 56 includes an embedded web address 58 to the remote selfie website 82, and an embedded camera ID 59. Scanning the code 56 allows the processor 32 within the mobile device 30 to use the embedded web address 58 to access the remote selfie website 82. The processor 32 also provides the camera ID 59 to the remote selfie website 82. The remote selfie website 82 uses the camera ID 59 to determine the GPS coordinates defining the geofenced region 52 for the camera 54.

After scanning the code 56, the browser 38 in the mobile device 30 is opened and takes the user to a URL (uniform resource locator) that is encoded in the link. The URL corresponds to the embedded web address 58. The user now has access to the remote selfie website 82 at Block 106.

At Block 108, the remote selfie website 82 verifies the geolocation of the mobile device 30. This requires the user of the mobile device 30 to enable location services. With location services enabled, the remote selfie website 82 accesses GPS within the mobile device 30 to determine a location of the mobile device.

The mobile device 30 needs to be within the boundary area defined for the geofenced region 52 in order to operate the control mounted camera 54. If the user does not enable the location services or the mobile device 30 is not within the defined boundary of the remote selfie photo location 50, then the user is denied access to the control mounted camera 54.

After verification that the mobile device 30 is within the boundary of the geofenced region 52, the remote selfie website 82 checks the cache memory 42 in the mobile device 30 for a device ID 44 at Block 110.

If the user of the mobile device 30 had previously scanned a code 56 at a different remote selfie photo location 50, then the device ID 44 would have been generated at that time and placed in the cache memory 42. If there is no device ID 44 in the cache memory 42, then one is generated by the remote selfie website 82. The device ID 44 does not change between different remote selfie photo locations 50. The device ID 44 remains in the cache memory 42 until the cache is cleared.

As web pages from the remote selfie website 82 are loaded by the browser 34, JavaScript functions may be included within the web pages. The JavaScript functions may be configured to look for a device ID 44 in the cache memory 42. As noted above, if a device ID 44 is not found, then one is generated by the remote selfie website 82 and provided to the mobile device 30 for storage in the cache memory 42.

At Block 112 a web page is displayed on the display 34 within the mobile device 30, wherein the web page provides a live video feed from the control mounted camera 54 at the remote selfie photo location 50. The control mounted camera 54 is specific to the URL that was provided in the scanned code 56.

Prior to the web page with the live video feed being displayed, a welcome page is displayed. If the user decides to select continue, then an instruction web page is displayed. This web page instructs the user to enable location services and to turn up the volume on their mobile device 30. The remote selfie website 82 will provide audible cues to assist the user on operating the control mounted camera 54. Also, the user may need to select acceptance of the terms and privacy policy of the remote selfie photography system 20 to continue.

The web page with the live video feed provides a photo session timer that counts down so that the user is aware of how much time is remaining to take a selfie photo. To take the selfie photo, the user presses a user selected input (i.e., a camera button) on the web page at Block 114. This causes a command to be sent to the remote selfie website 82.

After the camera button has been pressed, the user interface of the web page changes to instruct the user to look up at the control mounted camera 54. An audible countdown timer is provided so the user knows when the selfie photo is to be taken. The user will hear a click sound indicating that the selfie photo has been taken.

In response to receiving the command to take the selfie photo, the remote selfie website 82 communicates with the camera microservice 84. The function of the camera microservice is to control operation of the control mounted camera 54.

An API call is made at Block 116 by the remote selfie website 82 to the camera microservice 84 for a capture API to trigger the control mounted camera 54 to take the selfie photo. The API call may be made through a SignalR connection. A SignalR connection provides real time functionality.

The camera microservice 84 returns a signal back to the remote selfie website 82 saying that the selfie photo was taken and is ready to be downloaded. The remote selfie website 82 then communicates back to the camera microservice 84 for the selfie photo which is then pulled down at Block 118 by the remote selfie website 82. The selfie photo may be stored in a remote selfie storage 83 at the web server 80. In other embodiments, the remote selfie storage 83 may be located separate from the web server 80.

Once the selfie photo has been pulled down from the camera microservice 84 to the web server 80, the next step is to send the selfie photo to the overlay microservice 86 via an API call at Block 120 for editing. The overlay microservice 86 includes an image processor to overlay creative artwork 87 on the selfie photo at Block 121. The selfie photo with the creative artwork 87 is then provided to the web server 80.

A determination is made at Block 122 by the web server 80 on if the user of the mobile device 30 has digital rights to the selfie photo with the creative artwork 87. If the user had purchased a photo package prior to accessing the remote selfie website 82, then the user has digital rights to the selfie photo with the creative artwork 87. In this case, the selfie photo with the creative artwork 87 is shown to the user at Block 124.

The user provides an email address 45 when purchasing the photo package. This email address 45 is provided to the web server 80, and is also stored in the cache memory 42 on the mobile device 30. When the remote selfie website 82 accesses the cache memory 42, the device ID 44 and the email address 45 are retrieved. The remote selfie website 82 associates the device ID 44 and the email address 45 with the email address stored at the web server 80 when the photo package had been purchased to determine that the user has rights to the selfie photo with the creative artwork 87.

If the user does not have digital rights to the selfie photo with the creative artwork 87, then the web server 80 adds a watermark 89 to the selfie photo with the creative artwork 87 at Block 123. The selfie photo with the creative artwork 87 and the watermark 89 is then shown to the user at Block 124.

The user then decides to save the selfie photo or retake a new selfie photo at Block 126. If the user decides not to save the selfie photo, then the user is directed back to Block 112 to view the live video feed from the camera 52 again. The user then repeats the steps back to Block 126.

If the user decides to save the selfie photo, then an association is made by the remote selfie website 82 between the device ID 44 in the cache memory 42 and the saved selfie photo. In otherwords, the device ID 44 and the saved selfie photo are linked together.

The user is then directed to a web page for purchasing the selfie photo at Block 130 if the user has not already purchased a photo package. The web page may display the selfie photo as a thumbnail. The selfie photo includes the creative artwork 87 and the watermark 89. The user has an option to click on a buy button on the thumbnail. If other selfie photos have been taken by the user and saved, then these selfie photos are also displayed. The process ends at Block 132.

Figure 3:
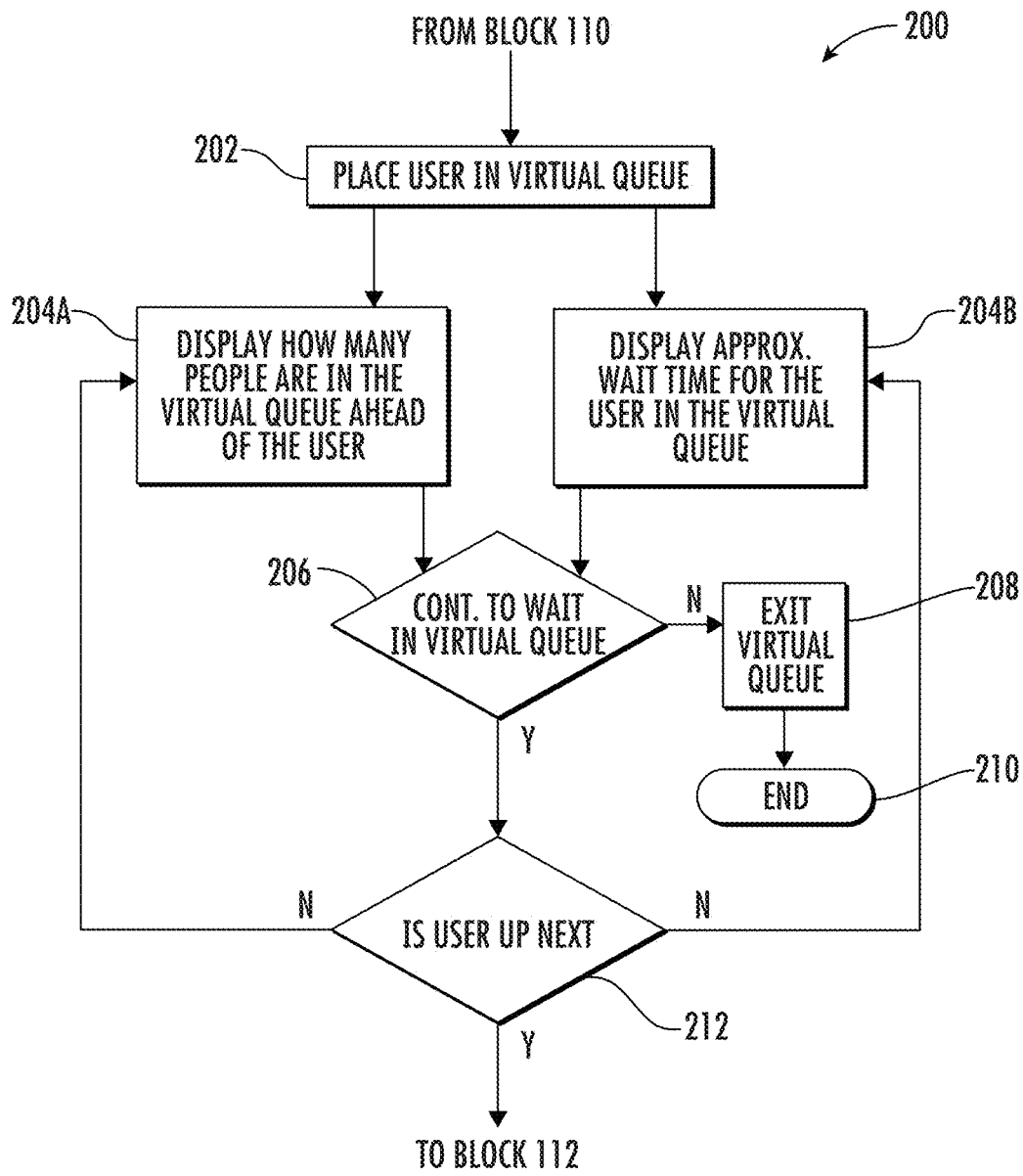
FIG. 3 is a flow diagram when placing a user of the remote selfie photography system illustrated in FIG. 1 in a virtual queue.

Referring now to FIG. 3, a flow diagram 200 when placing a user of the remote selfie photography system 20 in a virtual queue will be discussed. The flow diagram 200 is an extension between Blocks 110 and 112 in the flow diagram 100.

If the user is to wait in line before operating the control mounted camera 54, then the user is placed in a virtual queue in Block 202. The virtual queue may also be referred to as a virtual line.

A web page from the remote selfie website 82 accessed by the mobile device 30 is displayed to the user. On the web page, the number of people ahead of the user in the virtual queue is displayed in Block 204A. An approximate wait time for the user in the virtual queue may also be displayed on the web page in Block 204B.

In Block 206, the user decides whether or not to continue waiting in the virtual queue. If the user does not want to wait in the virtual queue, then the user selects an exit virtual queue input being displayed on the web page. Alternatively, the exit virtual queue input may be displayed as a leave line input. The user then exits the virtual queue in Block 208, and the process ends in Block 210.

If the user decides to wait in the virtual queue, then the process continues to Block 212. If the user is not up next, then the process loops back to Blocks 204A and 204B to update how many people are still in the virtual queue and the approximate wait time for the user in the virtual queue. If the user is up next, then the process continues to Block 112 where a live video feed from the control mounted camera 54 is displayed to the user.

Referring now to FIGS. 4-10, screen shots of the user's mobile device 30 directing the user during operation of the remote selfie photography system 20 will be discussed.

Figure 4:
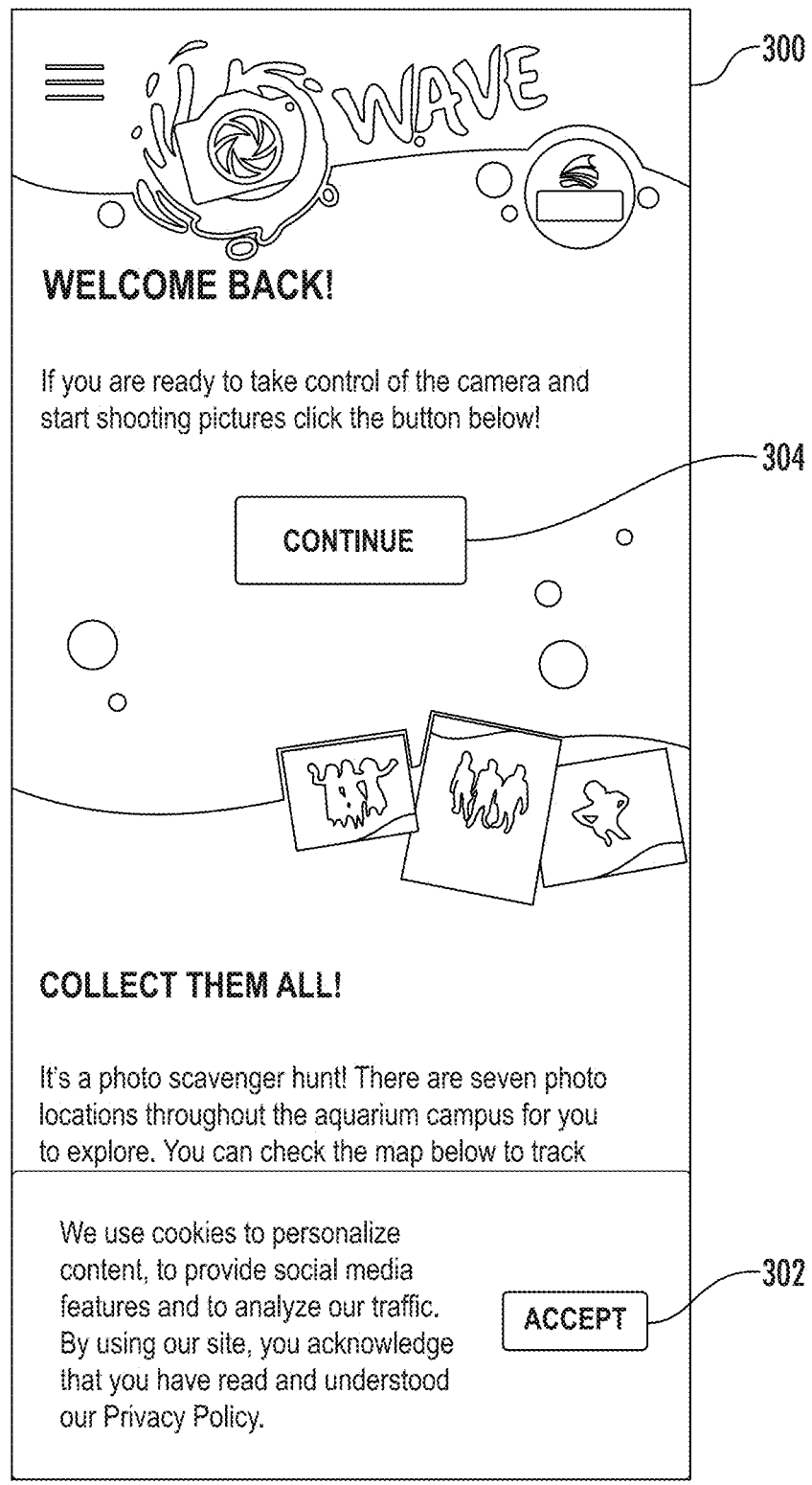
FIGS. 4-10 are screen shots of the user's mobile device directing the user during operation of the remote selfie photography system illustrated in FIG. 1.

In FIG. 4, a welcome screen shot 300 is provided to the user after the user scans the code 56 displayed at the remote selfie photo location 50. To continue, the user clicks on the accept button 302 for cookies to be loaded and then clicks on the continue button 304.

Figure 5:
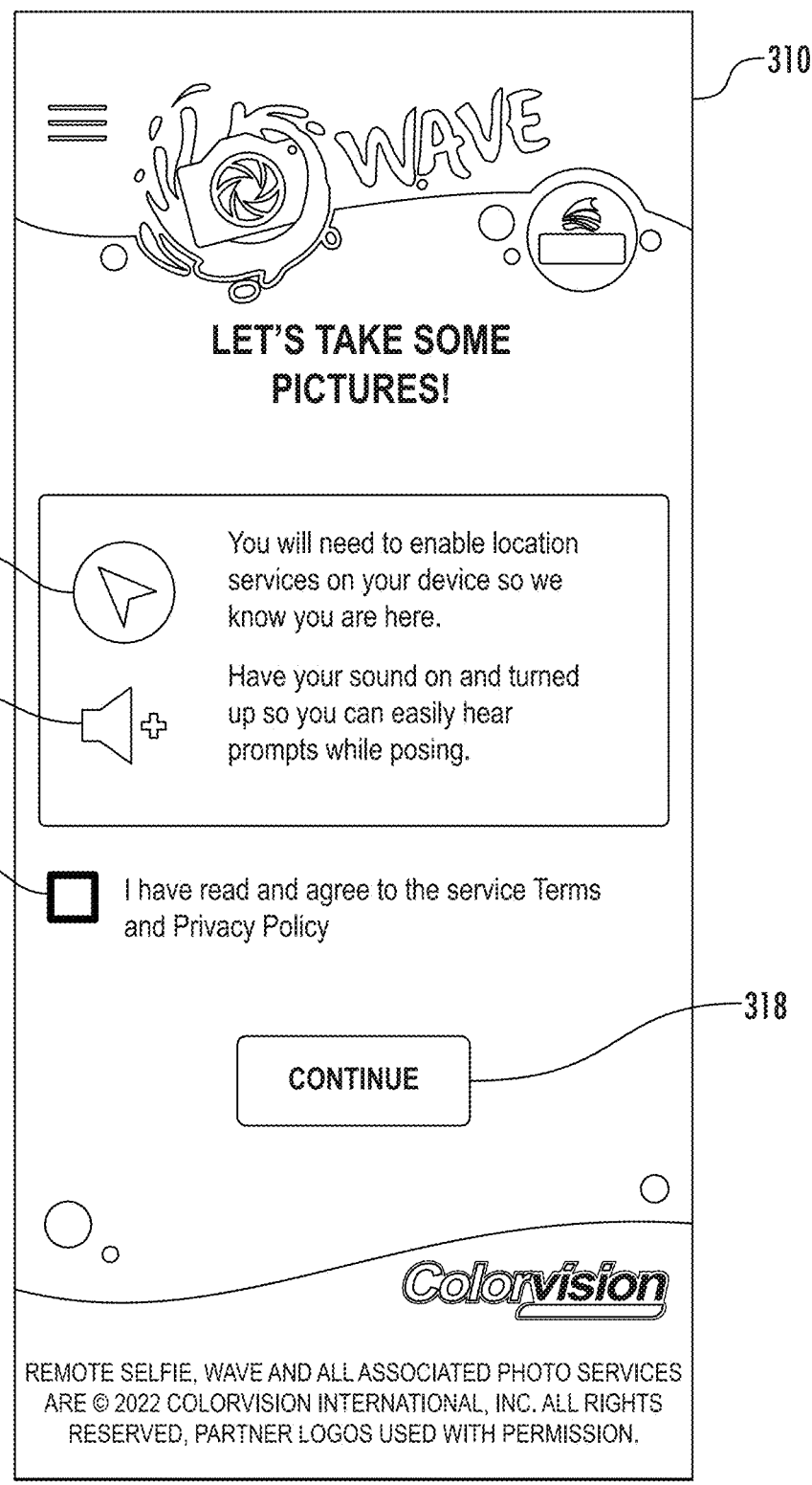

Instructions are provided to the user in screen shot 310 as shown in FIG. 5. This web page instructs the user to enable location services 312 and to turn up the volume 314 on their mobile device 30. The remote selfie website 82 will provide audible cues to assist the user on operating the control mounted camera 54. Also, the user may need to select acceptance of the terms and privacy policy 316 of the remote selfie photography system 20. The user then clicks on the continue button 318 to continue.

Figure 6:
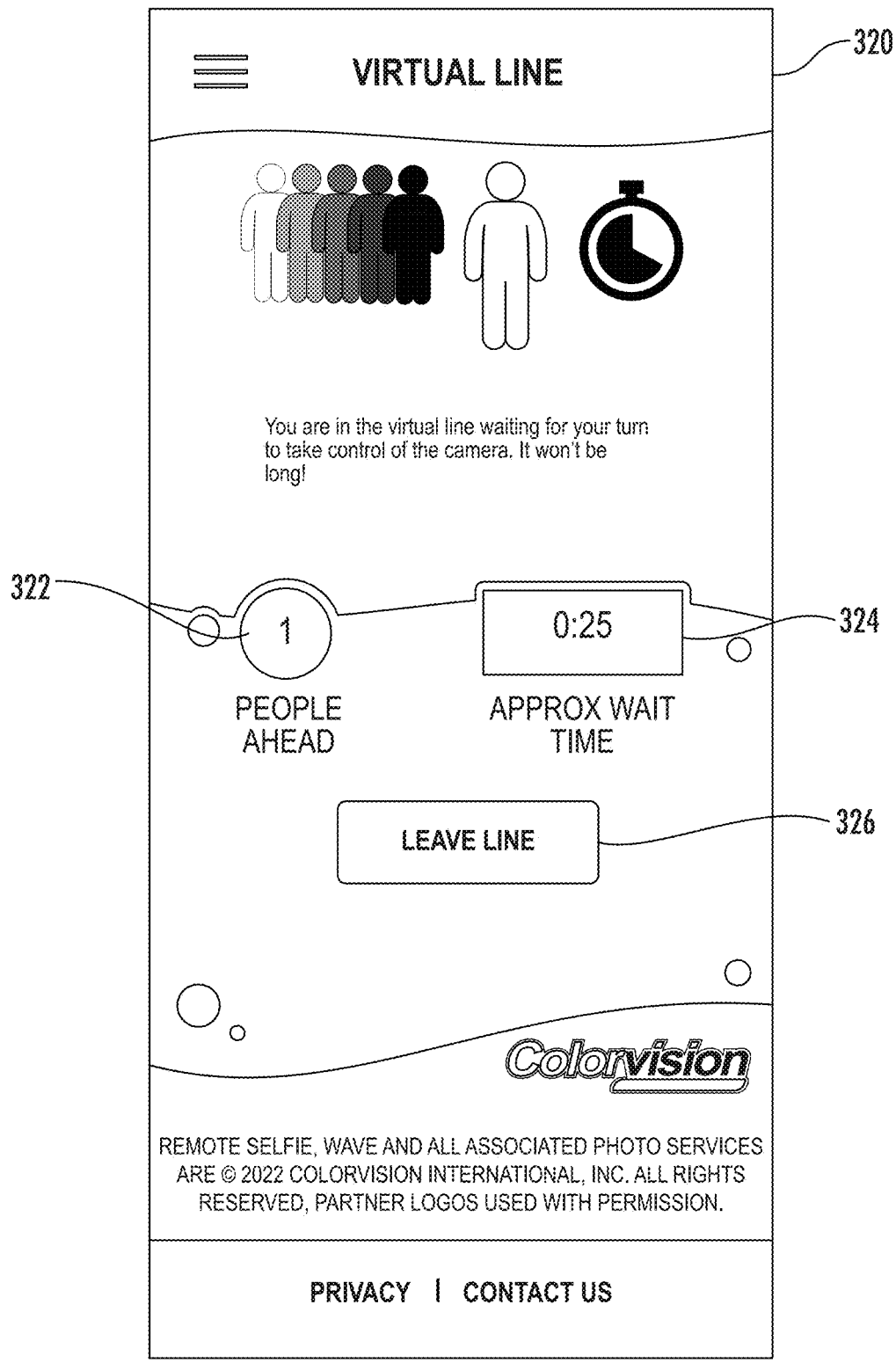

If other users are waiting for their turn to operate the camera 54, then the user is placed in a virtual queue or virtual line as provided by screen shot 320 in FIG. 6. The virtual queue notifies the user on how many people 322 are ahead of the user and the approximate wait time 324. If the user decides not to wait in the virtual line, then the user clicks on the leave line button 326.

Figure 7:
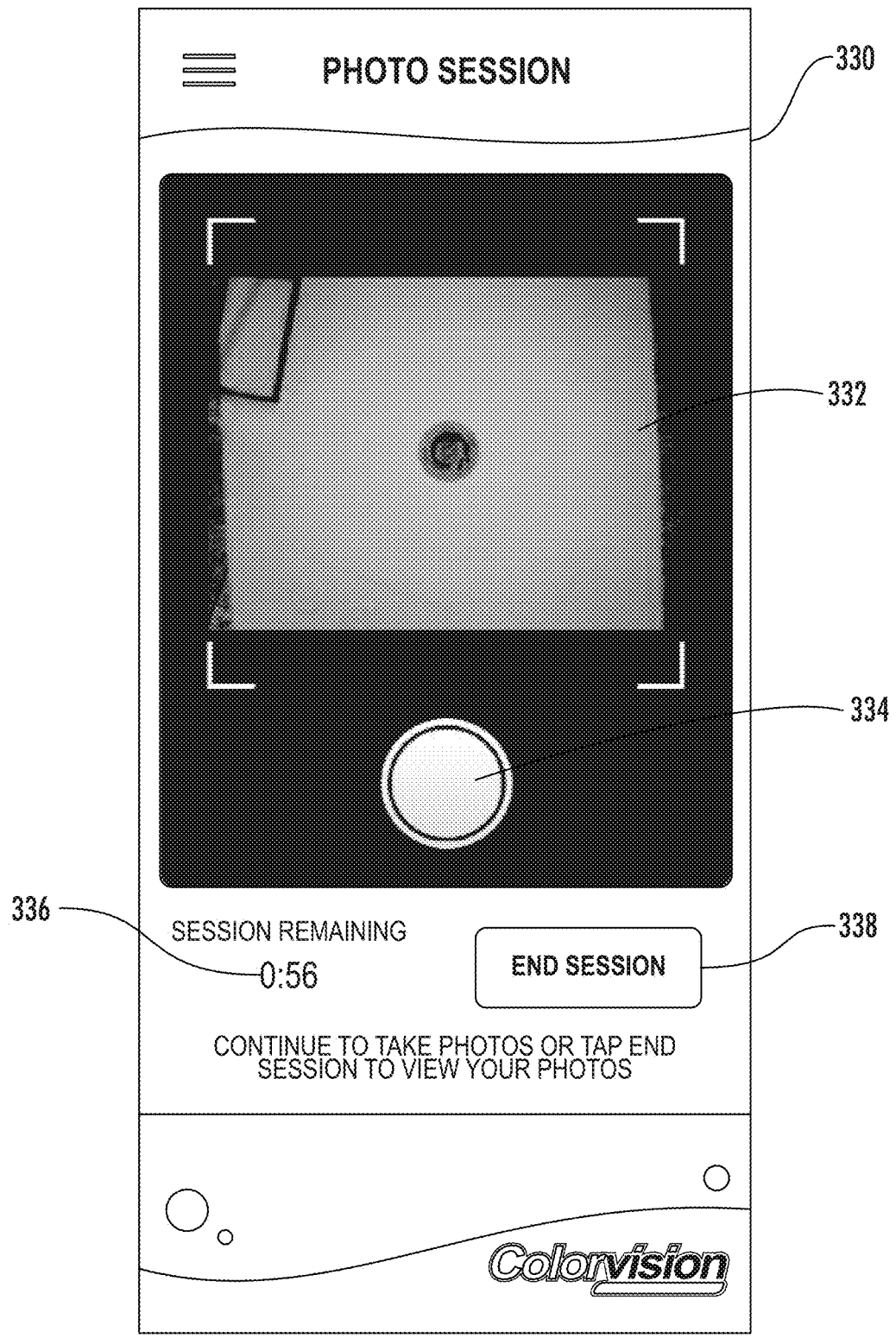

Screen shot 330 in FIG. 7 is of a web page that provides a live video feed 332 from the camera 54 within the remote selfie photo location 50. A photo session timer 336 is displayed so that the user is aware of how much time is remaining to take a selfie photo.

To take the selfie photo, the user presses a camera button 334 on the web page. This causes a command to be sent to the remote selfie website 82. The user also has an option to end the photo session by clicking on the end session button 338.

Figure 8:
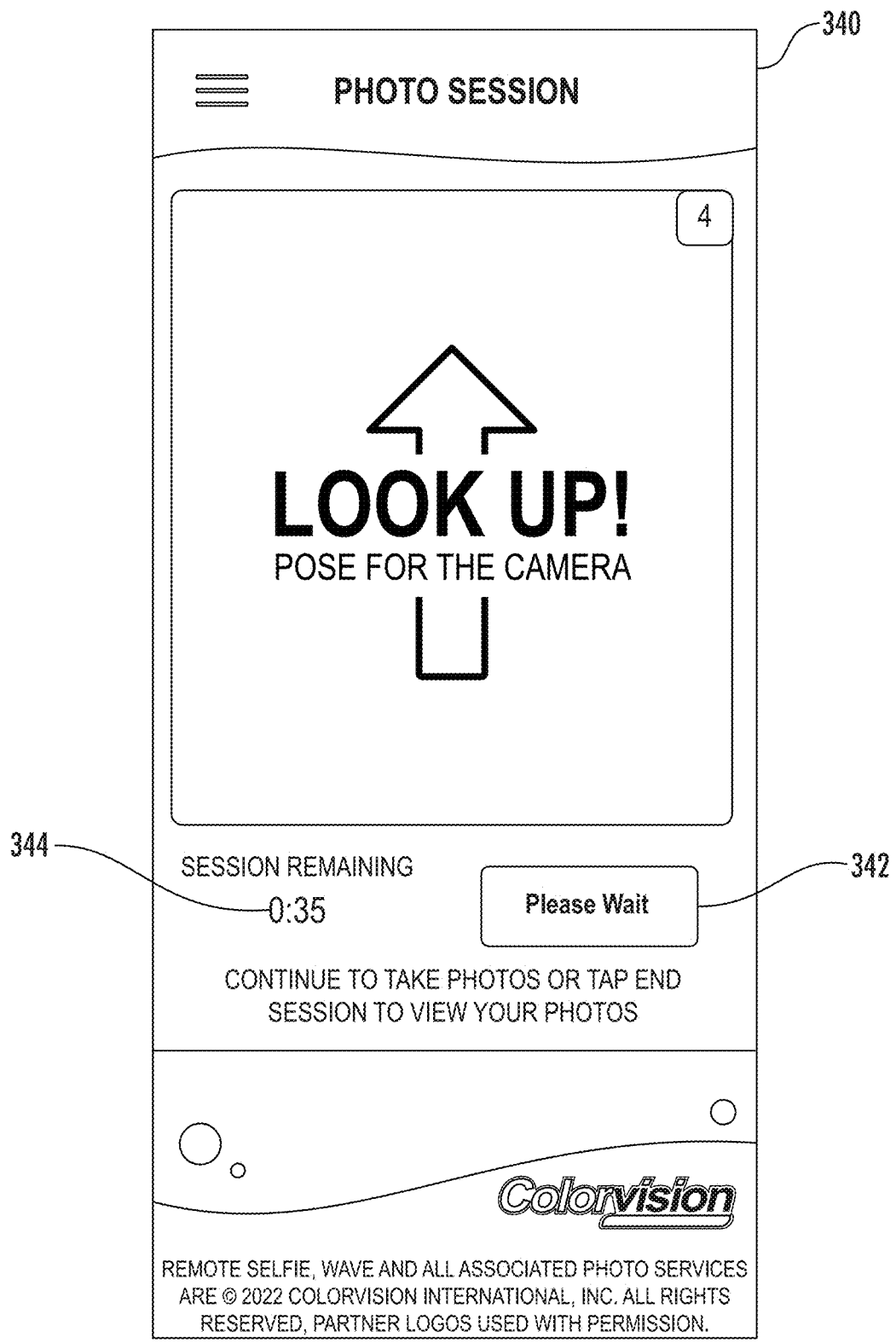

After the camera button 334 has been pressed, screen shot 340 is displayed as shown in FIG. 8. Here, the user interface of the web page instructs the user to look up at the camera 54. An audible countdown timer is provided so the user knows when the selfie photo is to be taken. The audible countdown timer counts down 3, 2, 1 followed by a click sound indicating that the selfie photo has been taken. The time remaining 344 in the photo session is also displayed.

Figure 9:
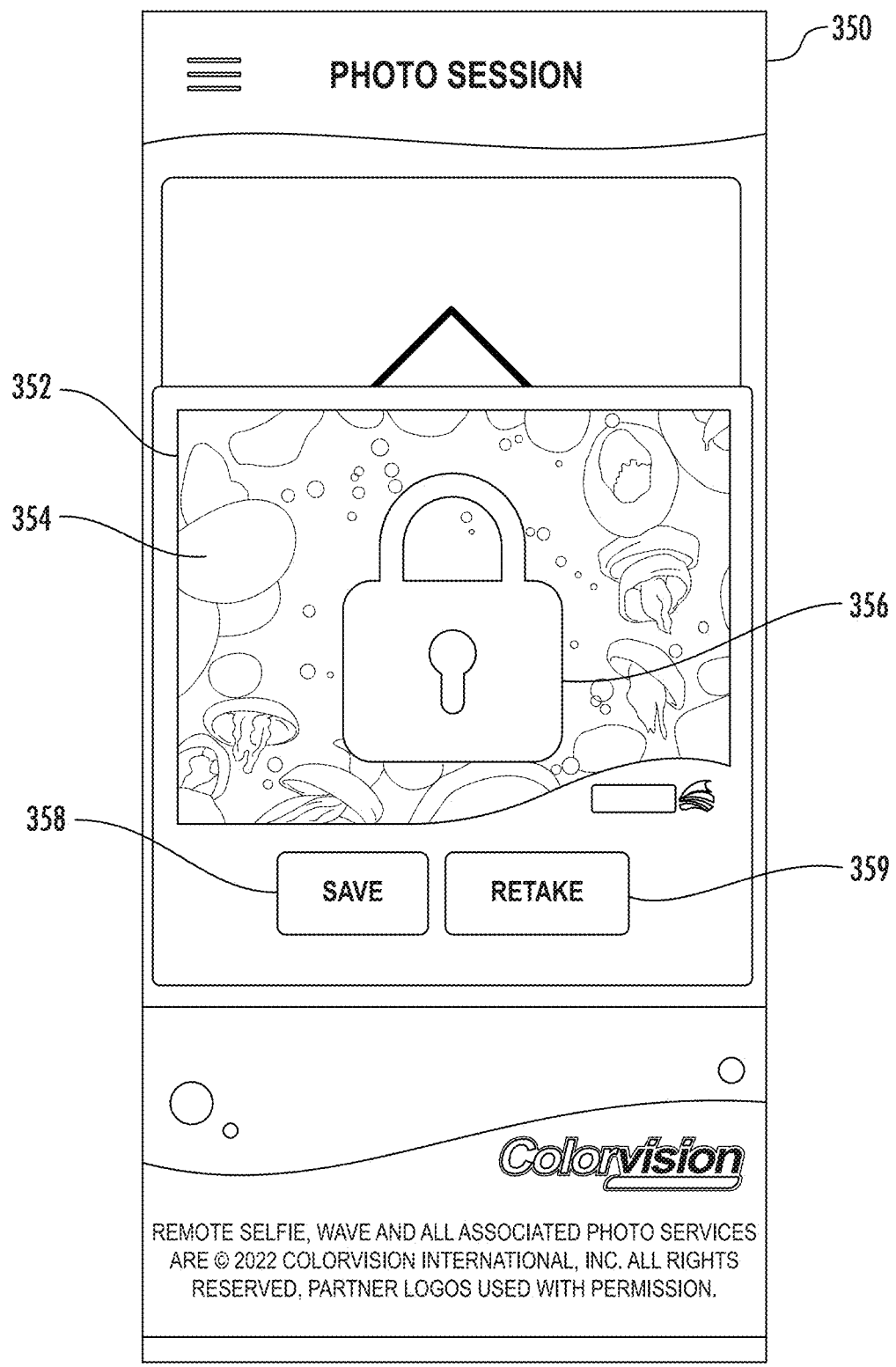

The selfie photo 352 taken by the control mounted camera 54 is displayed to the user in screen shot 350 as shown in FIG. 9. The selfie photo 352 is overlaid with artwork 354 and a watermark 356 if the user does not have digital rights to the selfie photo 352. The watermark 356 is provided in case the user tries to take a screen shot of the selfie photo to circumvent purchase of the selfie photo 352.

Figure 10:
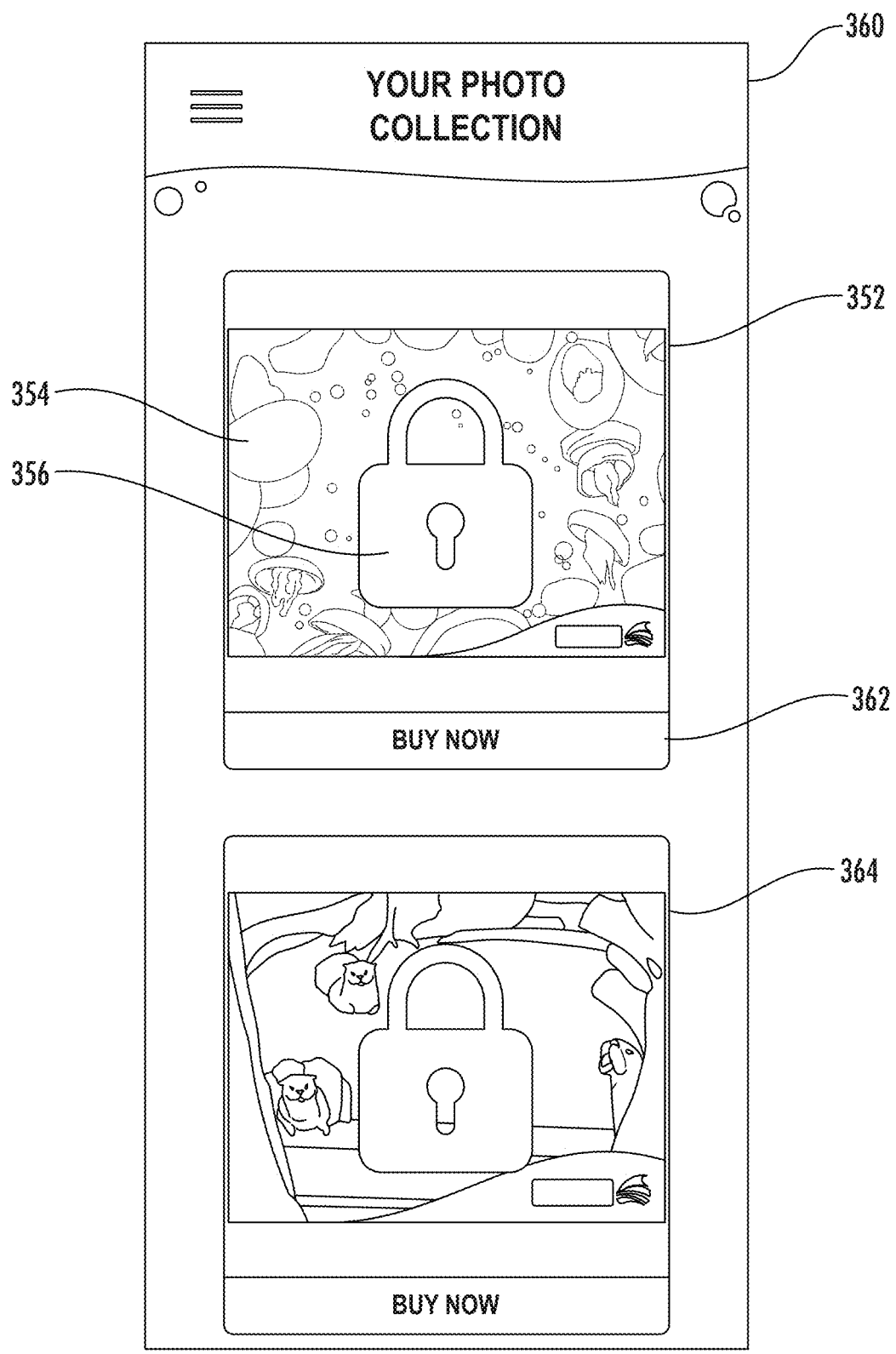

After viewing the selfie photo 352, the user has an option to save the selfie photo by clicking on the save button 358 or select the retake button 359. In response to the user choosing to save the selfie photo 352, screen shot 360 is displayed as shown in FIG. 10. The user has an option to select the buy now button 362. Screen shot 360 also displays other selfie photos saved by the user, such as selfie photo 364.

As discussed above, the device ID 44 is stored in cache memory 42. A drawback of using the cache memory 42 is that the memory is a volatile memory. If the cache memory 42 is cleared, then the device ID 44 is lost and cannot be retrieved. Any photos previously associated with the user cannot be retrieved since the device ID 44 is no longer available.

Also, if a different browser or even a different device is used to access the remote selfie web app 82, the previously stored device ID 44 is no longer available. Currently, the device ID 44 is stored on the mobile device 30 and not in a backend of the web server 80 with the remote selfie website 82.

Another aspect is directed to a method for operating the remote selfie photography system 20 as described above. The method may include providing a control mounted camera 54 having a geofenced region 52 associated therewith, and providing a remote selfie website 82 to communicate with the control mounted camera 54 and to access coordinates defining the geofenced region 52. The mobile device 30 may be operated to access the remote selfie website 82 via the web server 80, allow the remote selfie website 82 to access location of the mobile device 30, and receive video from the control mounted camera 54 via the remote selfie website 82 in response to the location of the mobile device 30 being within the geofenced region 52. The received video may be displayed along with a user-selected input for a user to operate the control mounted camera 54 to take a photo.

Yet another aspect of the disclosure is to associate an ID of the user on the backend of the web server 80. In this embodiment the device ID 44 may be replaced with an email address of the user. This would allow the user to retrieve their selfie photos even if the cache memory 44 had been cleared. This may be accomplished by providing a user system and an album system so that the association is more permanent on the backend.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A photography system comprising:
   a camera having a geofenced region associated therewith;
   a web server configured to provide a website to communicate with the camera, and to access coordinates defining the geofenced region; and
   a mobile device comprising:
      a processor configured to perform the following
         access the website via the web server,
         allow the website to access location of the mobile device, and
         receive video from the camera via the website in response to the location of the mobile device being within the geofenced region, and
      a display coupled to the processor and configured to display the received video along with a user-selected input for the user to operate the camera to take a photo.

2. The photography system according to claim 1 wherein the website is configured to place the user of the mobile device in a virtual queue until their turn is next in line.

3. The photography system according to claim 2 wherein the display is configured to display how many people are in line ahead of the user when in the virtual queue.

4. The photography system according to claim 2 wherein the display is configured to display an approximate wait time when in the virtual queue.

5. The photography system according to claim 1 comprising a code being displayed within the geofenced region, with the code having an embedded web address for the website, and wherein the mobile device comprises a camera and a browser coupled to the processor, with the camera being configured to scan the code for the processor to access the website via the browser.

6. The photography system according to claim 5 wherein the website is configured to access a location of the mobile device in response to the mobile device accessing the website, with the accessed location to be used to determine that the mobile device is within the geofenced region.

7. The photography system according to claim 5 wherein the code comprises a QR code.

8. The photography system according to claim 1 wherein in response to the user operating the camera to take the photo via the user-selected input, the photo is displayed on the display.

9. The photography system according to claim 8 wherein the website places a themed overlay on the displayed photo.

10. The photography system according to claim 8 wherein the display displays with the photo a save user input and a retake user input.

11. The photography system according to claim 10 wherein in response to the user selecting the save user input, the photo is saved by the website, with the website having generated a device ID to be used by the website to link the user of the mobile device to the saved photo.

12. A method for operating a photography system comprising:
providing a camera having a geofenced region associated therewith;
providing a website to communicate with the camera, and to access coordinates defining the geofenced region; and
operating a mobile device to perform the following
access the website via the web server,
allow the website to access location of the mobile device,
receive video from the camera via the website in response to the location of the mobile device being within the geofenced region, and
display the received video along with a user-selected input for a user to operate the camera to take a photo.

13. The method according to claim 12 comprising placing the user of the mobile device in a virtual queue until their turn is next in line.

14. The method according to claim 13 comprising displaying at least one of how many people are in line ahead of the user when in the virtual queue, and an approximate wait time when in the virtual queue.

15. The method according to claim 12 comprising operating the mobile device to scan a code being displayed within the geofenced region to access the website, with the code having an embedded web address for the website.

16. The method according to claim 15 wherein the website is configured to access a location of the mobile device in response to the mobile device accessing the website, with the accessed location to be used to determine that the mobile device is within the geofenced region.

17. The method according to claim 12 comprising displaying the photo in response to the user operating the camera via the user-selected input.

18. The method according to claim 17 comprising placing a themed overlay on the displayed photo.

19. The method according to claim 17 comprising displaying along with the photo a save user input and a retake user input.

20. The method according to claim 19 wherein in response to the user selecting the save user input, the photo is saved by the website, with the website having generated a device ID to be used by the website to link the user of the mobile device to the saved photo.

* * * * *